(12) United States Patent
Ketels et al.

(10) Patent No.: US 10,583,757 B2
(45) Date of Patent: Mar. 10, 2020

(54) OCCUPANT SUPPORT SYSTEM

(71) Applicant: Faurecia Automotive Seating, LLC, Auburn Hills, MI (US)

(72) Inventors: Cedric Ketels, Holland, MI (US); Tristan J. Vanfossen, Belmont, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 82 days.

(21) Appl. No.: 15/810,329

(22) Filed: Nov. 13, 2017

(65) Prior Publication Data

US 2018/0134191 A1    May 17, 2018

Related U.S. Application Data

(60) Provisional application No. 62/422,207, filed on Nov. 15, 2016.

(51) Int. Cl.
| | |
|---|---|
| *B60N 2/66* | (2006.01) |
| *B60N 2/50* | (2006.01) |
| *B60N 2/64* | (2006.01) |
| *H02N 10/00* | (2006.01) |
| *F03G 7/06* | (2006.01) |
| *B60N 2/90* | (2018.01) |

(52) U.S. Cl.
CPC ............ *B60N 2/501* (2013.01); *B60N 2/503* (2013.01); *B60N 2/643* (2013.01); *F03G 7/065* (2013.01); *H02N 10/00* (2013.01); *B60N 2/667* (2015.04); *B60N 2/6671* (2015.04); *B60N 2002/924* (2018.02)

(58) Field of Classification Search
CPC ........ B60N 2/501; B60N 2/503; B60N 2/643; B60N 2/667; F03G 7/065; H02N 10/00

USPC .......................................... 297/284.1–284.11
See application file for complete search history.

(56) References Cited

U.S. PATENT DOCUMENTS

| | | | | |
|---|---|---|---|---|
| 4,159,847 A | * | 7/1979 | Arai ....................... | B60N 2/667 297/284.4 |
| 6,088,643 A | * | 7/2000 | Long ....................... | A47C 4/54 701/49 |
| 6,092,871 A | * | 7/2000 | Beaulieu ................. | A47C 7/462 297/284.4 |
| 6,652,029 B2 | * | 11/2003 | McMillen ............... | A47C 7/462 297/284.4 |
| 7,052,087 B2 | * | 5/2006 | McMillen ............ | B60N 2/6673 297/284.4 |
| 7,758,121 B2 | * | 7/2010 | Browne .................. | B60R 7/043 297/284.11 |

(Continued)

FOREIGN PATENT DOCUMENTS

WO    2009114457    9/2009

OTHER PUBLICATIONS

Office Action dated Nov. 20, 2018 for U.S. Appl. No. 15/813,345 (pp. 1-9).

(Continued)

*Primary Examiner* — Syed A Islam
(74) *Attorney, Agent, or Firm* — Barnes & Thornburg LLP

(57) ABSTRACT

A vehicle seat includes a seat bottom and a seat back. The seat back is coupled to the seat bottom to move relative to the vehicle seat. The vehicle further includes a support mechanism coupled to the vehicle and configured to vary support provided to an occupant sitting on the vehicle seat.

15 Claims, 7 Drawing Sheets

(56) References Cited

U.S. PATENT DOCUMENTS

| | | | |
|---|---|---|---|
| 7,905,547 B2 * | 3/2011 | Lawall | B60N 2/0224 297/284.4 |
| 7,905,548 B2 * | 3/2011 | Gupta | B60N 2/0224 297/284.9 |
| 7,909,403 B2 * | 3/2011 | Lawall | B60N 2/4235 297/284.9 |
| 8,038,215 B2 * | 10/2011 | Di Giusto | B60N 2/6671 297/284.1 |
| 8,100,471 B2 * | 1/2012 | Lawall | B60N 2/4279 297/216.1 |
| 8,998,320 B2 * | 4/2015 | Mankame | B60N 2/002 297/284.11 |
| 9,056,570 B2 | 6/2015 | Laib | |
| 10,315,771 B1 * | 6/2019 | Rao | B64D 11/0639 |
| 2009/0224587 A1 | 9/2009 | Lawall | |
| 2012/0267928 A1 | 10/2012 | Mankame | |
| 2014/0239677 A1 | 8/2014 | Laib | |
| 2015/0251580 A1 * | 9/2015 | Sachs | A61H 9/0078 297/180.13 |

OTHER PUBLICATIONS

Office Action dated Mar. 8, 2019 for U.S. Appl. No. 15/813,345, 4106 US-U ‖ (pp. 1-6).

* cited by examiner

OCCUPANT SUPPORT SYSTEM

PRIORITY CLAIM

This application claims priority under 35 U.S.C. § 119(e) to U.S. Provisional Application Ser. No. 62/422,207, filed Nov. 15, 2016, which is expressly incorporated by reference herein.

BACKGROUND

The present disclosure relates to a seat, and particularly to a vehicle seat. More particularly, the present disclosure relates to a vehicle seat which is movable provide variable support to an occupant resting on the vehicle seat.

SUMMARY

According to the present disclosure, an occupant support includes a vehicle seat mounted to a floor of the vehicle. The vehicle seat includes a seat bottom and a seat back coupled to the seat bottom.

In illustrative embodiments, the occupant support system includes a structure comprising at least one adjustable arm configured to move away from the seat back and configured to provide support or a massage sensation to an occupant. The orientation of the at least adjustable arm may be horizontal or vertical relative to the seat back of the vehicle seat. The structure may be of any type of plastic or any other lightweight material.

In illustrative embodiments, the occupant support system further includes an actuation system comprising a user interface and a thermal activation controller in order to control the position of the adjustable arm relative to a frame of the seat back. In some embodiments the adjustable arm is controlled by a thermally activated material such as a shape memory alloy.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A is a perspective and diagrammatic view of an occupant support in a neutral position having a generally flat seat back prior to thermal activation as the occupant support would exist in typical ambient environmental temperatures;

Figure 1:
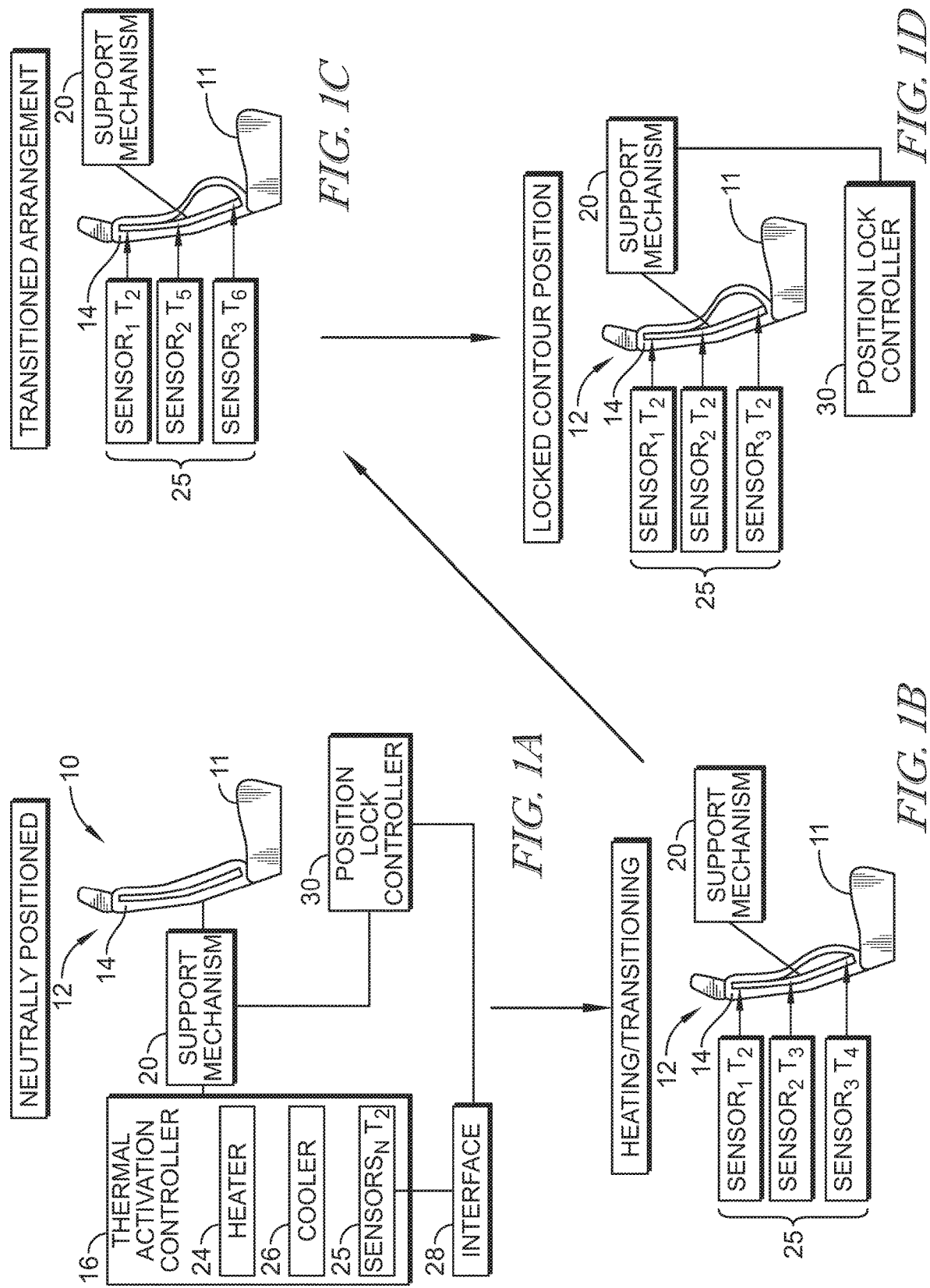
FIGS. 1A-1D are a series of views showing an occupant support transitioning from a neutral, or relaxed contour position to a different contoured support position.
Figure 2:
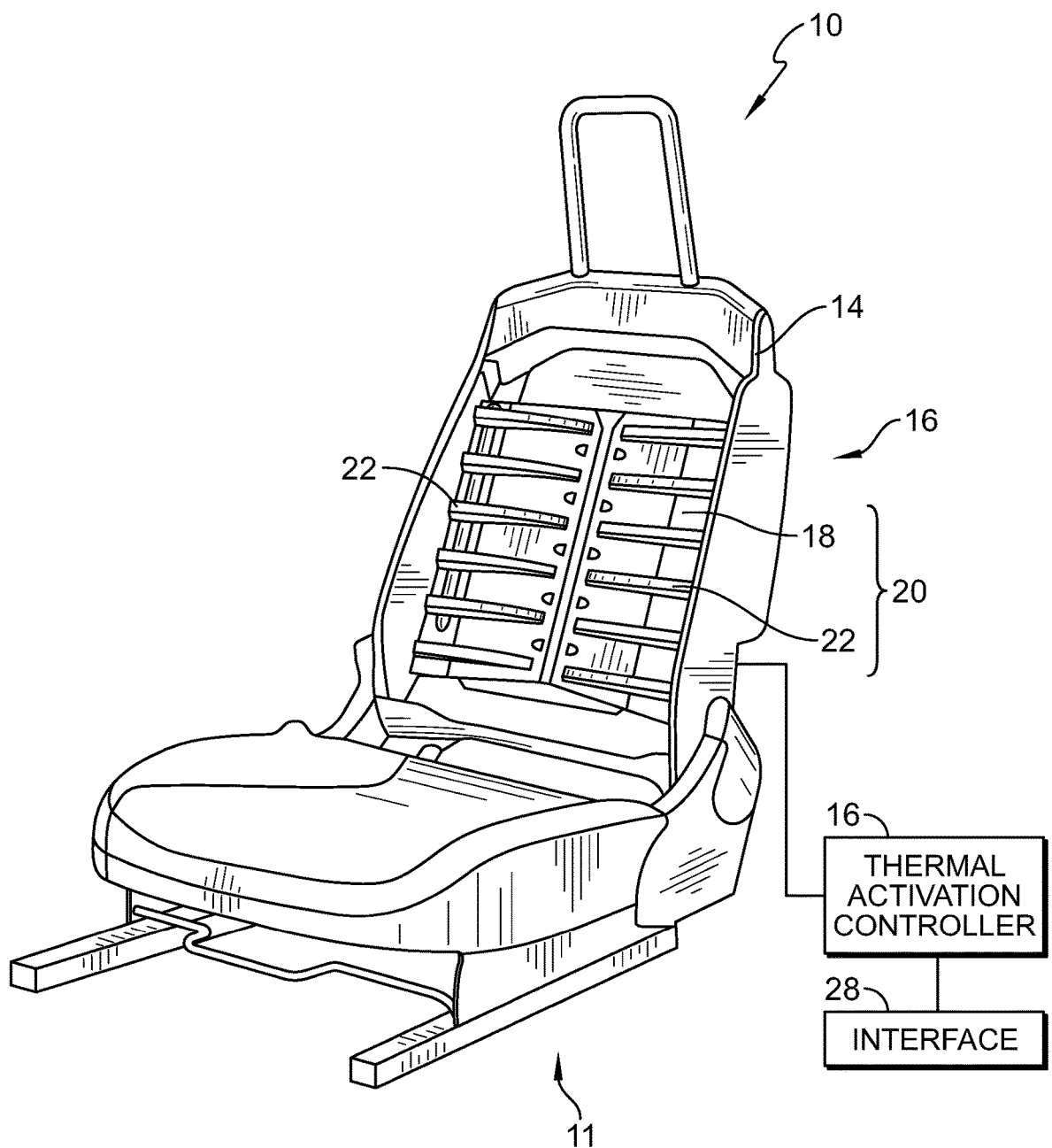
Figure 3:
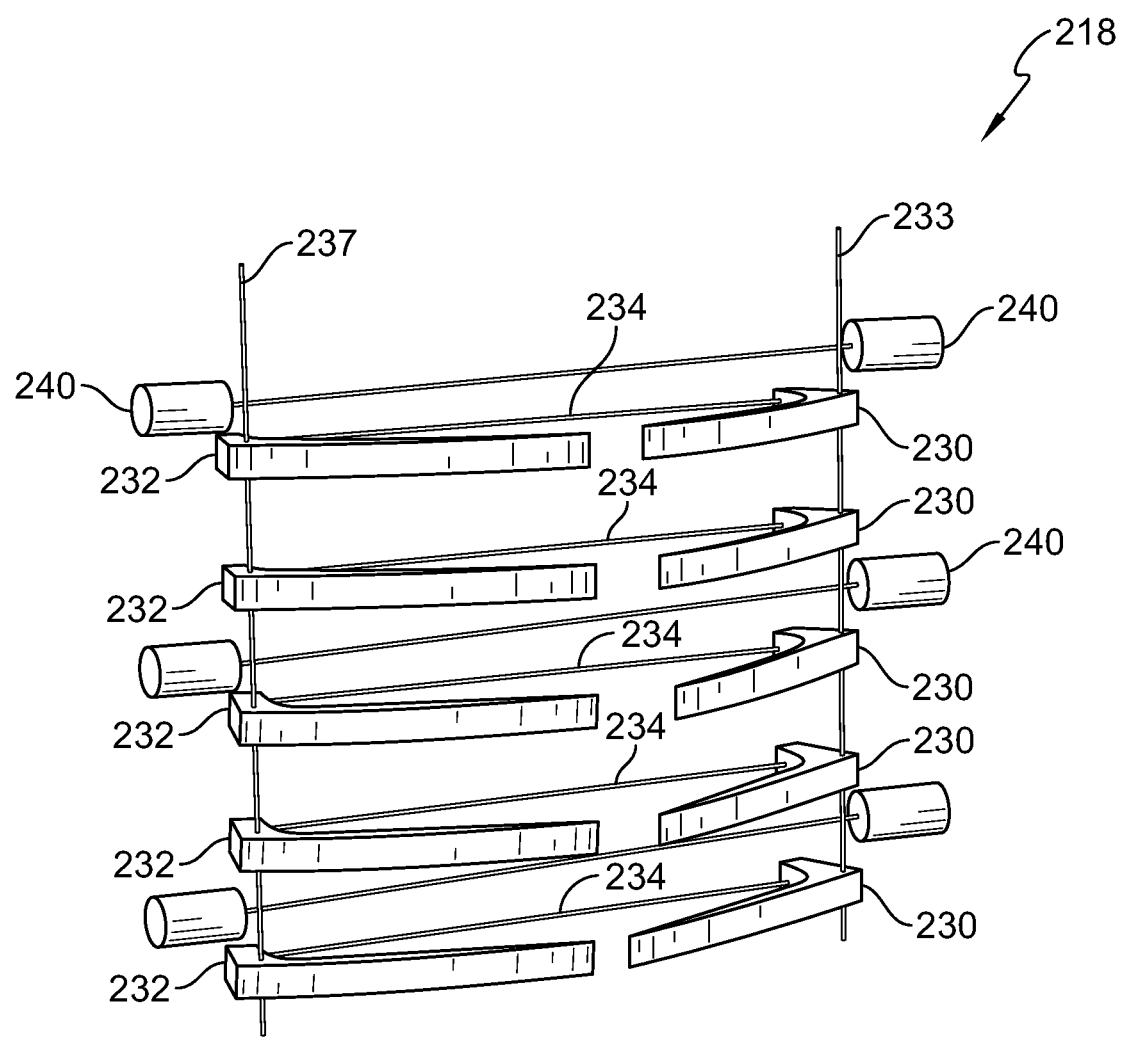
Figure 4:
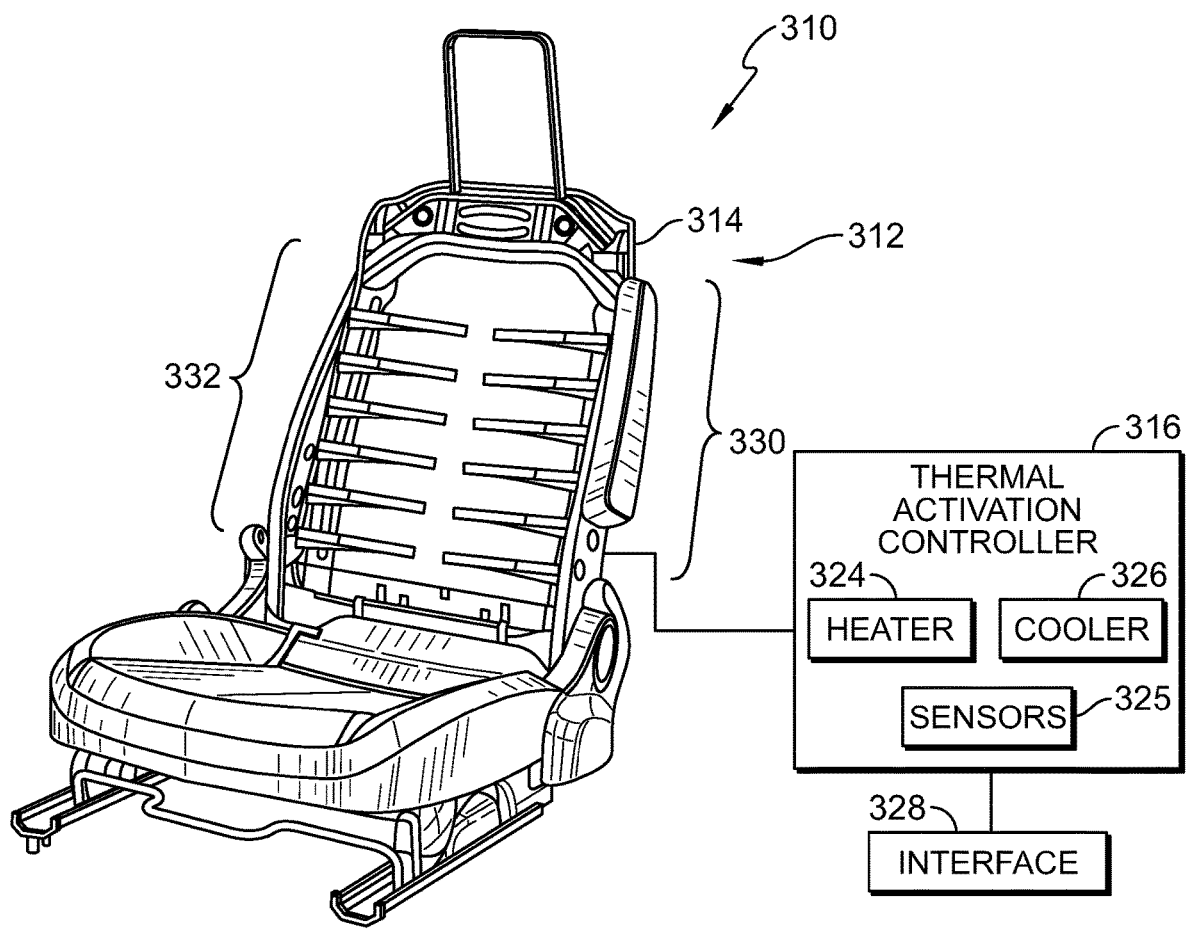
Figure 5:
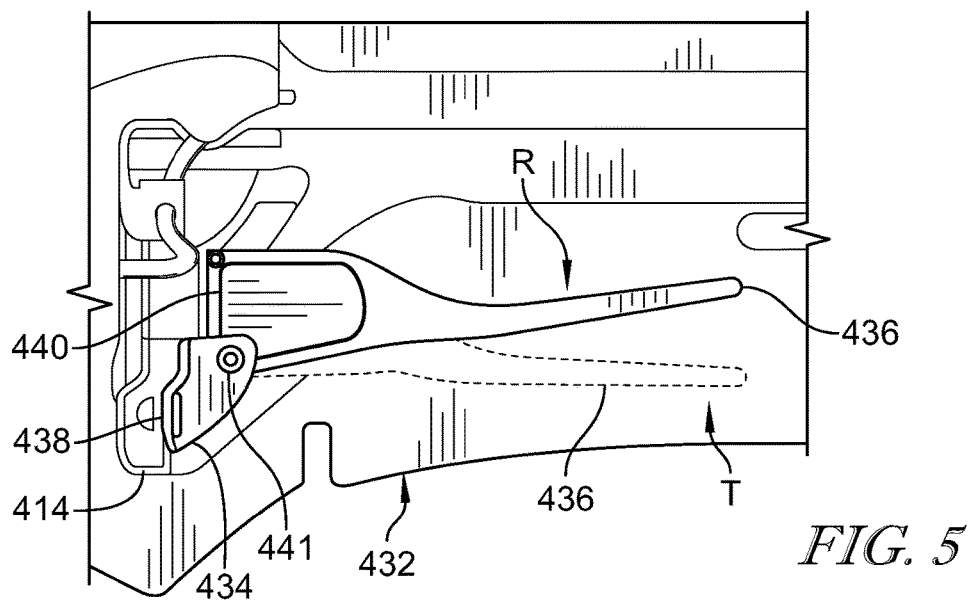
Figure 6:
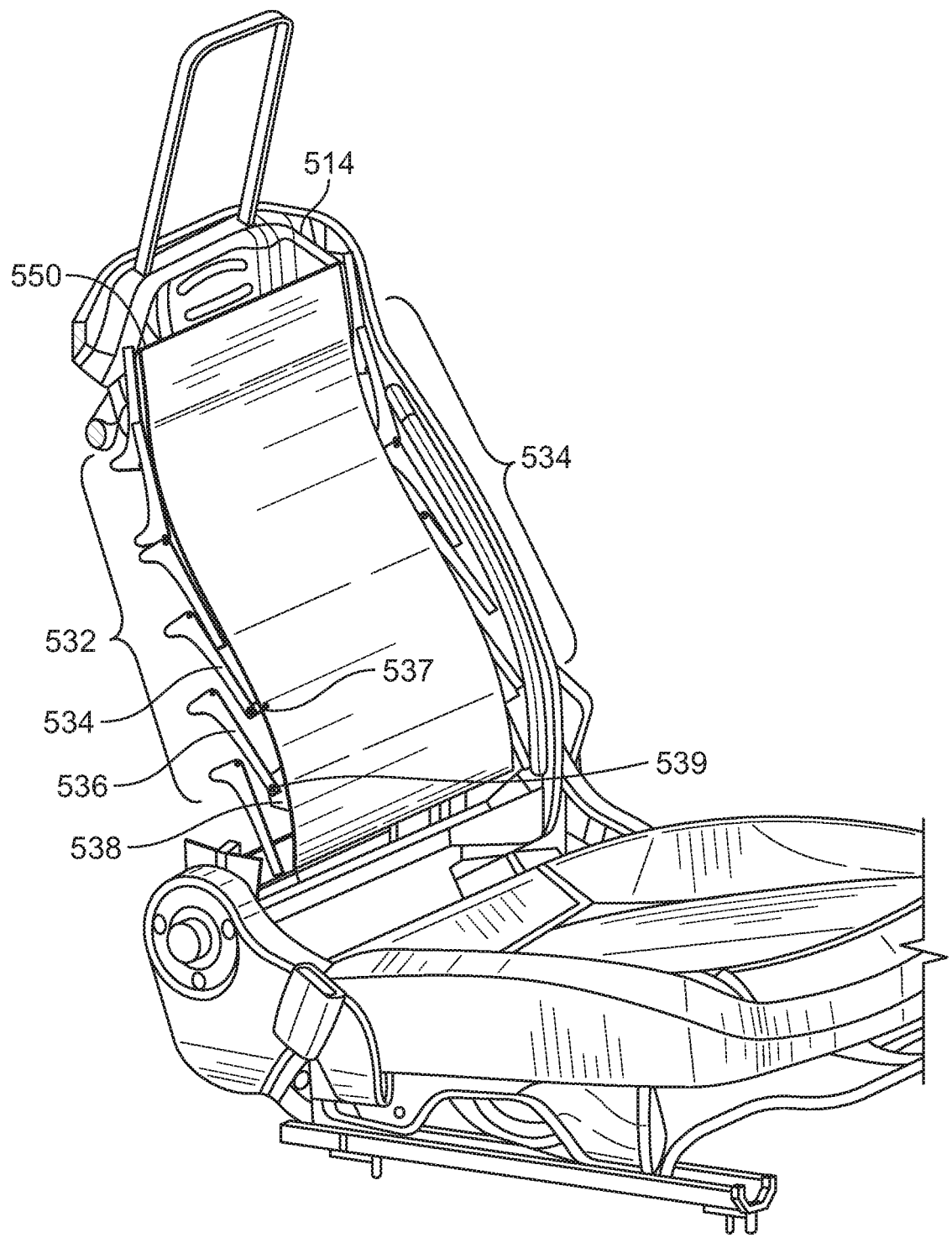
Figures 6A, 6B:
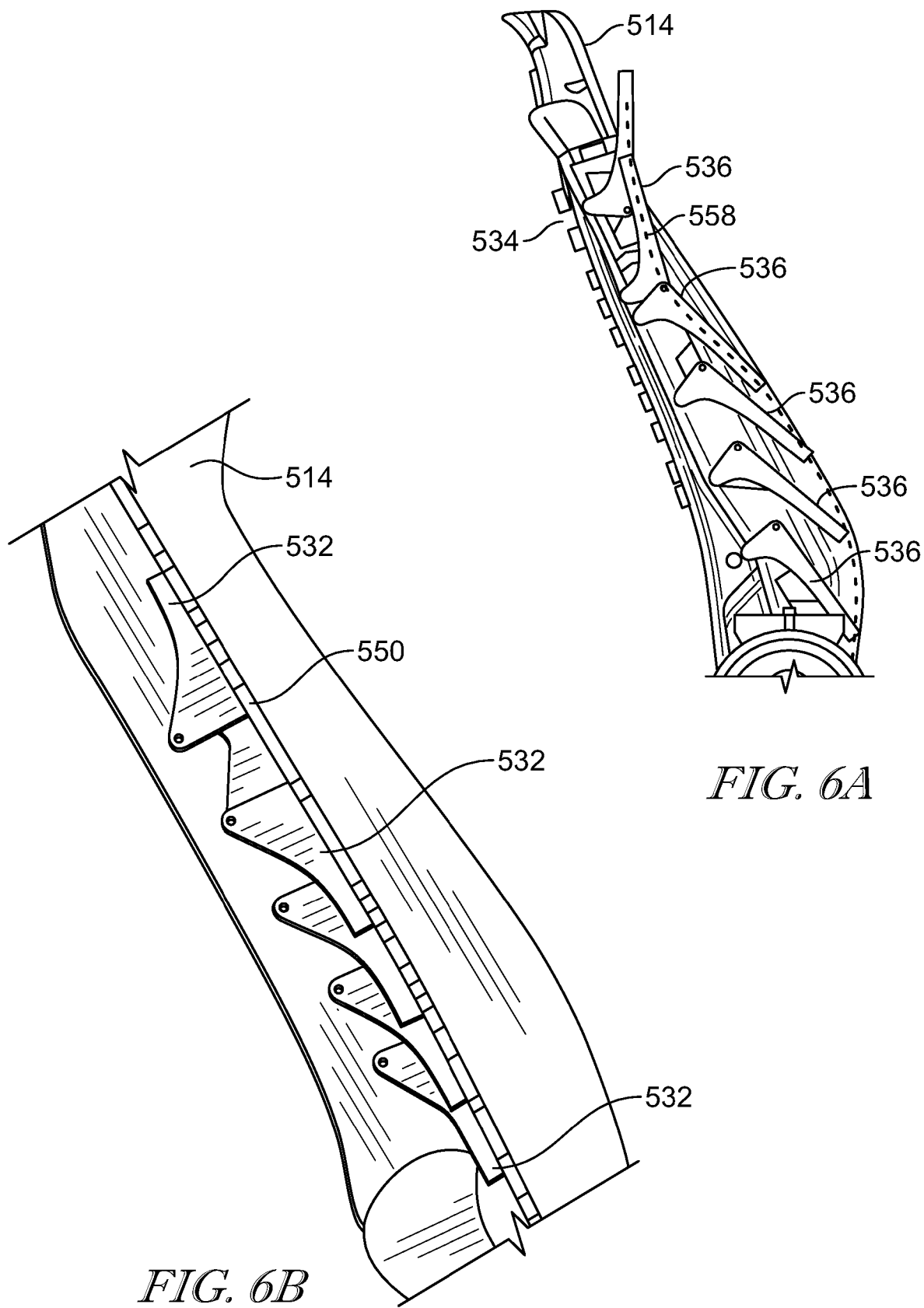
Figure 7A:
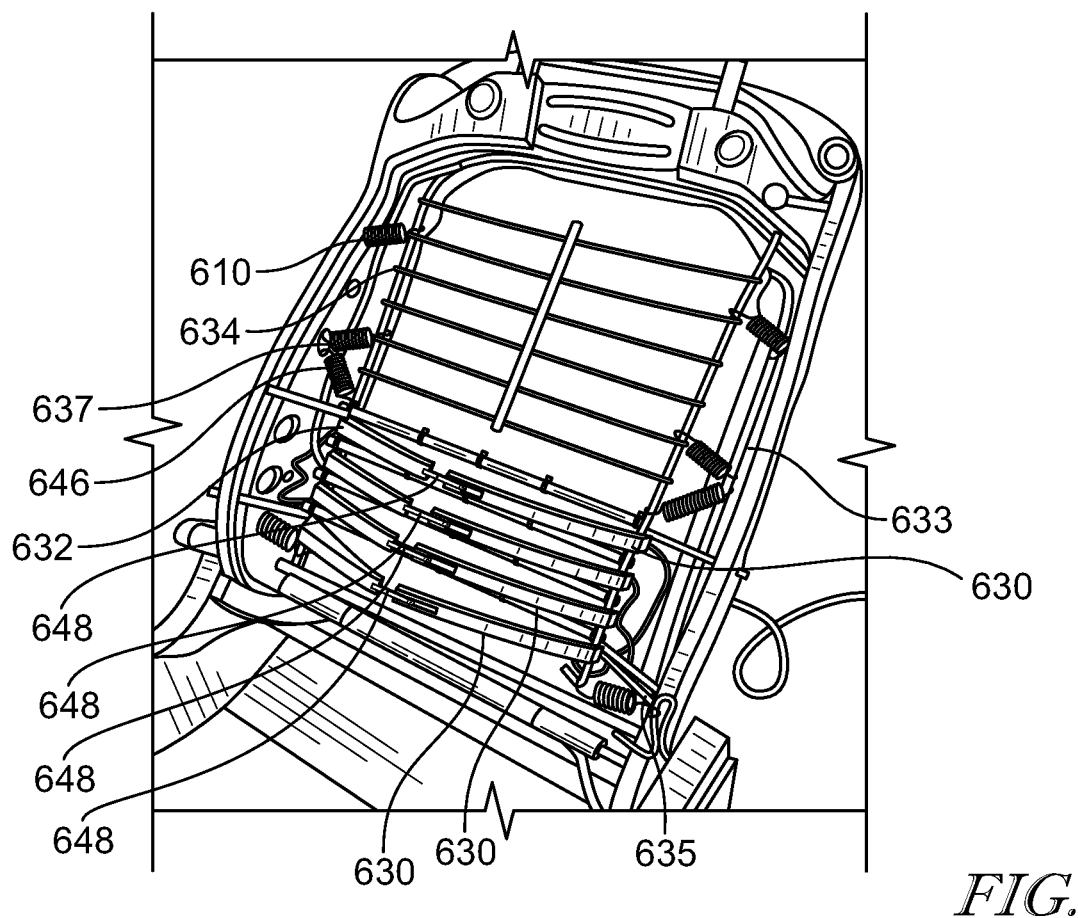
Figure 7B:
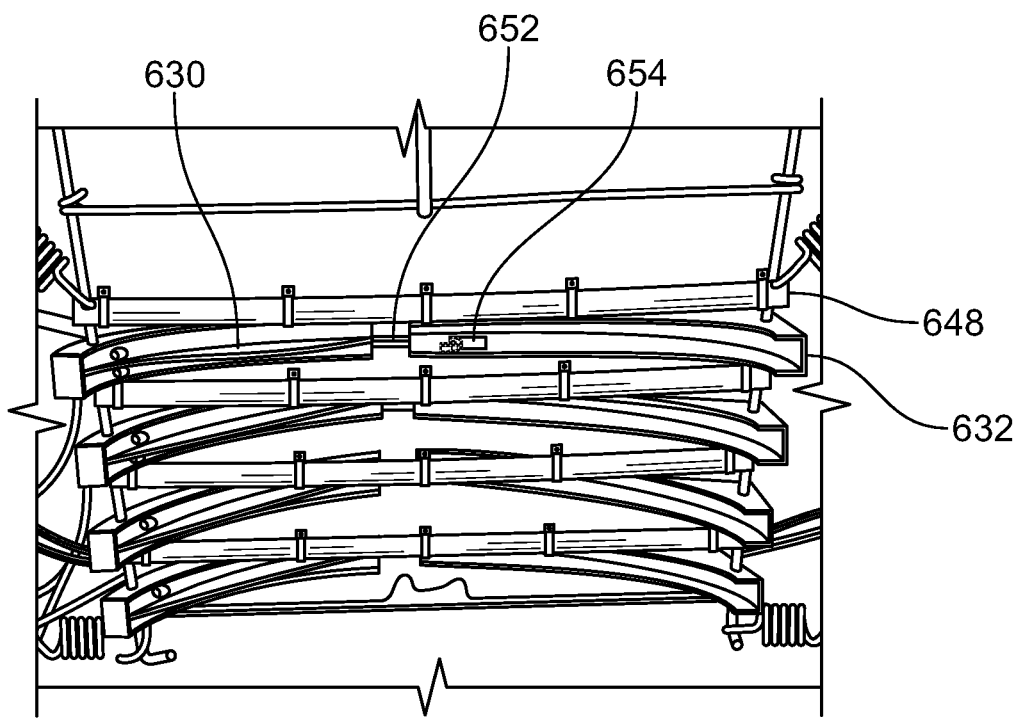

FIG. 1B is a view similar to FIG. 1A showing the occupant support during targeted temperature control in which a first upper portion of a seat back of the occupant support is at a first temperature, a second middle portion of the seat back is at a second temperature, and a third bottom portion of the seat back is at a third temperature and a corresponding changing in the seat back contour that is occurring during the changes in temperature from the environmental temperature;

FIG. 1C is a view similar to FIGS. 1A and 1B showing the occupant support at the different contoured support position and the first upper portion of the seat back is at the first temperature, the second middle portion of the seat back is at a fifth temperature, and the third bottom portion of the seat back is at a sixth temperature and a corresponding contoured support position is established;

FIG. 1D is a view similar to FIGS. 1A-1C in which a position lock controller included in the occupant support has locked the seat back in the different contoured support position and the thermal activation controller is deactivated so that the temperatures at each of upper, middle, and lower portions revert to an environmental temperature;

FIG. 2 is a perspective view of the occupant support with portions removed to show adjustable arms coupled to a suspension mat forming a support mechanism for changing to the different contour;

FIG. 3 is a partial perspective view of the support mechanism used in the seat back of FIG. 2 showing that the adjustable arms are coupled to vertical rails of the suspension mat;

FIG. 4 is a is a partial cut-away of a vehicle seat back of FIGS. 1A-1D showing that the adjustable arms are coupled in a horizontal arrangement to a seat back frame of the vehicle seat back forming a support mechanism for changing to the different contour;

FIG. 5 is an enlarged plan view of a portion of the occupant support of FIG. 4 showing how a wire is coupled to the arm to interconnect a stationary base of the arm and a longitudinal projection of the arm to drive a camming motion of the adjustable arm;

FIG. 6 a partial perspective view of a another embodiment of an occupant support in accordance with the present disclosure with portions broken away to reveal several adjustable arms coupled in a vertical arrangement to a suspension mat forming a support mechanism;

FIG. 6A is a partial elevation view a vehicle seat back included in the occupant support of FIG. 6 showing the adjustable arms in a transitioned contoured position;

FIG. 6B is a view similar to FIG. 6A showing the adjustable arms in the relaxed neutral position;

FIG. 7A is a front partial perspective view of another embodiment of an occupant support in accordance with the present disclosure with portions broken away to reveal several adjustable arms that are coupled together at free ends of longitudinal projections along a midline axis of a vehicle seat back forming pairs of adjustable arms that slide relative to each other during transitioning from relatively contracted to expanded positions; and FIG. 7B is a rear partial perspective view of the occupant support of FIG. 7A.

DETAILED DESCRIPTION

FIGS. 1A-1D illustrate a process of transitioning a vehicle-seat support by regulating the temperature of materials in the vehicle seat. FIGS. 2-5 show an embodiment of how a vehicle-seat occupant support may be configured to transition according to the present disclosure. FIGS. 6-6b show another embodiment of how a vehicle-seat occupant support may be configured to change shape. FIGS. 7A-7B show a third embodiment of how a vehicle-seat occupant support may be configured to change shape.

FIGS. 1A-D are a series of diagrammatic and side views of an exemplary vehicle-seat support transition process where a vehicle-seat support included in a vehicle seat changes in shape to change support to an occupant sitting in the vehicle seat. The vehicle-seat support transition process begins in FIG. 1A at a first point where the vehicle seat may be in a neutral unregulated position. The process proceeds in FIG. 1B to a second point where targeted heating may be applied to portions of the vehicle seat support thereby changing the seat back support contour. The process proceeds in FIG. 1C to a third point where a desired seat back contour has been reached. The process then proceeds to a fourth point where the seat back is locked in the desired second seat back contour and the heating is discontinued.

The transitioning process shown in FIGS. 1A-1D shows a vehicle seat 10 having a seat bottom 11 and a seat back 12 neutrally positioned. In disclosed embodiments the neutral position is relaxed and minimally supportive but may be relatively stiff and maximally supportive. Adjustment of the support provided by the seat back 12 may be implemented by an interface 28, such as a vehicle display interface, dashboard, or even buttons or sensors located on the vehicle seat 10.

When a request for a change in the seat contour is detected at the interface 28, thermal activation controller 16 may activate heaters 24 and/or coolers 26 at targeted locations on a support mechanism 20 in the seat back 12. As seen in FIG. 1B these changes in temperatures regulated by feedback sensors 25 result in changes of the geometry of the contour of the seat back 16. For example, an upper portion of the seat back 16 at sensor 1 may be maintained at an environmental temperature T2, while a middle portion of the seat back may be heated to temperature T3 and a lower portion of the seat back may be heated to temperature T4.

Temperatures at each of the sensors 25 will be monitored and temperature modified until a desired transitional arrangement or contour of the seat back 16 is achieved in FIG. 1C. As seen in this configuration, for example, the upper seat back portion was maintained at temperature T2 while the middle portion was increased further to temperature T5 and the lower portion increased even further to temperature T6. Upon reaching the transitioned contour of the seat back, the temperature may be maintained, or the position lock controller 30 may be activated to maintain the support mechanism 20 in the contoured position. The position lock controller 30 may be a mechanical mechanism such as a ratcheting mechanism, gearing mechanism, or pin, which locks each independently heat adjustable portion of the vehicle seat thereby locking the overall contour of the seat back 14 in the second position. The thermal activation controller 16 may then be deactivated and temperatures at sensors 25 can revert to the environmental temperature T2.

FIG. 2 is a diagrammatic view of a vehicle seat 10 configured to provide temperature-induced support and contour changes as discussed in FIGS. 1A-1C. As illustrated, the seat back 16 includes a seat back frame 14 and support mechanism 20 coupled to the seat back frame 14. In this embodiment the support mechanism 20 includes a plurality of adjustable arms 22 coupled to a suspension mat 18 that extends across and interconnects opposite sides of the seat back frame 14. As seen in this embodiment, adjustable arms 22 are arranged horizontally and in two vertical rows symmetrical about a vertical seat axis. Suspension mat 18 is coupled to the thermal activation controller 16, which includes one or more heaters 24, coolers 26, such as a series of transistors and a printed circuit board, and a plurality of sensors 25 for regulating temperature of wires that form the suspension mat 18. Interface 28 may be programmed to include a plurality of predefined contour configurations, which can be user-specific and selectable, to drive thermal activation controller 16.

As further seen in FIG. 3, the suspension mat 218 of support mechanism 220 includes two vertical support wires 236, 238 and a plurality of horizontally extending wires 234 extending between the vertical support rail wires 236, 238. Seat back frame connectors 240, such as springs, are arranged on outer sides of the vertical support rail wires 236, 238. A plurality of adjustable arms 232 are coupled to one vertical support wire 236. A second plurality of adjustable arms 230 are coupled to the other vertical support wire 238 forming a rib-cage-like configuration. In some embodiments the adjustable arms are affixed by a spring-actuated clip, or any other suitable mechanical securing mechanisms. The adjustable arms 230, 232 may be formed of a polymeric material. Each adjustable arm 230 232 may be configured to be rotated independently relative to all of the other adjustable arms to rotate towards, and out away from the suspension mat 218. In some embodiments a horizontally extending wire 234 may extend beyond the vertical support rail wires 236, 238 and couple to a pair of corresponding adjustable arms 230, 232 to drive rotational movement of the adjustable arms 230, 232 as discussed in further detail below with respect to FIG. 5.

According to another embodiment in FIG. 4, support mechanism 320 includes the frame 314 of the seat back 312 and a plurality of adjustable arms 330, 332, coupled directly to the seat back frame 314. Positioning of adjustable arms 332, 334, is controlled individually, or by groups of arms, by thermal activation controller 316 and interface 328. As seen in more detail in FIG. 5, each adjustable arm 432 includes a fixed base 434 coupled to a longitudinal protrusion portion 436, which is rotatable about the fixed based at a pivot point 441, such as a pin. The base portion 434 may be coupled to the frame 414 in a fixed position by a bolt, screw 438, any suitable alternative, or combinations thereof.

Rotation of adjustable arm 432 is achieved via a wire 440 made of a heat-actuating material, such as a shape memory alloy (SMA) such as nitinol, coupled to the fixed base portion 434 at one end and following a contour of and coupled to the longitudinal protrusion portion 436 at the other end. This wire 440 configuration may also be used in adjustable arms 22, 232, 230, 332, 330, 532,530, 632, 630. In some embodiments, the SMA wires are heat-treated to induce a shape-memory effect. These processed wires are configured to have two crystal structures defined by austenitic and martensitic phases. In the cold (below activation temperature) martensitic phase, the material is malleable, whereas in the high (above activation temperature) austenitic phase, the material is rigid. The transformation (heating above the activation point, which is unique to the particular composition of active material used) from martensitic to austenite phases creates a significant amount of force in the SMA. It is this transformation force that is utilized by the actuation mechanism for driving the rotation of adjustable arm 432. Maintaining the temperature above the activation temperature will leave the material in the austenite phase, which is very rigid. Upon cooling via active cooler or ambient cooling and cutoff of heater input 24, the material will revert to the martensitic phase. In some embodiments, heat-actuating materials are selected with transformation temperatures outside of the range of typical ambient temperatures, for example, above 150 degrees Fahrenheit.

In some embodiments, the shape memory alloy is a smart shape memory alloy (S-SMA), such as wire manufactured by Smarter Alloys™ of Waterloo, Ontario to use its Multiple Memory Material™. The S-SMA permits multiple positions to be programmed in a single wire 440 at distinct temperatures so that at multiple temperatures the single wire can be driven to a different shape, or tension, thereby driving the corresponding adjustable arm to different degrees of rotation. In other words, the S-SMA can also be nitinol that has been processed to have a plurality of transition phases.

FIG. 5 shows relaxed "R" and tensioned "T" configurations, which can also be referred to as initial and transformation positions, respectively. In this embodiment, the heat-responsive material or shape-memory alloy may act as a spring such that increasing the temperature will cause the tension of the wire 340 to increase, thereby driving the longitudinal protrusion 436 to the tensioned "T" position along a rotational path from position "R". If the material is processed to be a S-SMA then there may be a variety of discrete positions between the tensioned position and the relaxed position. In other words, the adjustable arm could be adjustable through a plurality of programmed positions before reaching a desired design position.

According to another embodiment, adjustable arms 532, 534 can be arranged vertically relative to a vehicle seat back 514. In this configuration, adjustable arms 532, 534 avoid contacting a user's back and instead are coupled to and manipulate the shape of a supportive sheet 550. Supportive sheet 550 may be a suspension mat as described above in FIGS. 2-3, a woven mat, or any other supportive flexible material and may be coupled to the seat frame of the vehicle seat back 514 and move by contact of the adjustable arms 532, 534, or the supportive sheet 550 may be directly attached to the adjustable arms FIG. 6 shows a view of a plurality of adjustable arms 532 coupled to the right side of the seat back 514. The adjustable arms 532 may be coupled by a screw, bolt, rivet, ring or any other suitable method as discussed above in FIG. 5. An example of a coupling is ring 537 illustrated in FIG. 6 extending through openings in the projection portion of adjustable arm 532 and supportive sheet 550. Another example of a coupling is a screw, bolt or rivet 539 extending through projection portion of adjustable arm 532 and a tongue 538 of the supportive sheet 550. For the purposes of illustration, one only of each coupling is depicted. However, rings may be used to couple each adjustable arm, or, screws, bolts or rivets may be used to couple each adjustable arm. FIG. 6A shows the plurality of adjustable arms 532 in tensioned positions. As previously discussed, the different angular tensioned positions may be achieved by driving S-SMA wires of the same material by applying different temperatures to reach different programmable positions. Corresponding longitudinal projections 536 of adjustable arms 534 on right and left sides of seatback 514 can be driven to similar symmetrical positions thereby forming an overall seat contour 558 of the supportive sheet shown in phantom. As can be seen, the overall contour 558 of the supportive sheet 5 in the illustrated tensioned position takes on an S-shape in this embodiment. In FIG. 6B, the adjustable arms 532 are shown in relaxed positions with adjustable arm taking on an overall linear contour when temperature control is not activated.

According to a further embodiment in FIGS. 7A-7B, a plurality of adjustable arms 632 coupled along the right side of the vehicle seat and a plurality of adjustable arms 630 coupled along the left side of the vehicle seat can be coupled together along their respective longitudinal projections 636 forming cooperating adjustable arm units 648 expanding and contracting in unison. Adjustable arms 632, 630 can be coupled to suspension mat via clips to respective vertical rail wires 633, 634. Although, it is also contemplated that the adjustable arms 632, 630 may be coupled directly to seat back frame as discussed with respect to FIGS. 4-5. As can be seen in FIG. 7B, one of the arms 630 may have a tongue 652 on its longitudinal projection while a corresponding opposite arm 632 can be have longitudinal groove 654 in its longitudinal projection. Tongue 652 and groove 654 can be slid able joined so that tongue 652 slides in groove 652 during contour change and movement of each adjustable arm 630, 632 without disconnecting, resulting in expansion and contraction movement of each adjustable arm unit 648 when corresponding wires are actuated.

Although heat activation has been disclosed as driving the adjustable arms in one direction towards what has generally been described as the tensioned positions, it is understood that the wires can alternatively be configured to drive the adjustable arms to the relaxed positions. Additionally, temperature control of the wires may be configured for control of each individual wire, for control of pairs of wires, or even groups of wires to be activated in the same manner. Additionally, adjustable arms can be controlled using cyclic fluctuation in temperatures in order to achieve an integrated massage effect working in a dependent or independent manner. Still further, although the disclosure is made in reference to the seat back 14, the system may also be applied to the seat bottom 11.

Wires described above in all of the embodiments. may take on a plurality of different formats such as plates, tubes, or sheets partially or fully made from a heat-actuatable material as described above. Any other material that includes suitable properties may be used to accomplish the same task, such as electroactive polymers of any material composition activated in any suitable available.

As shown in the FIGS., interfaces, actuation mechanisms and controllers may be embodied one or more additional electronic control units, embedded controllers, processors, engine computers, or other programmable computing devices used to control various vehicle functions.

The spine uses water and nutrients to stay healthy. Motion between vertebral discs causes water and nutrients to be provided. The motion acts as a pump to move fluids in and out of the disc to keep the spine hydrated. When an occupant remains the same position during a certain period of time, the spine does not move and therefore the hydration does not occur. This causes a feeling of fatigue and back pain for the occupant.

The beneficial impact of the moving the vehicle seat in strategic points via the adjustable arms during a certain period of time is to minimize fatigue and stress. The present occupant support system does this while minimizing weight and package size of the system. Further, the adjustable arm system may have clips allowing it to be mounted as an after market system.

Long periods of driving may cause an occupant of a vehicle to have uncomfortable sensations and fatigue due to his stationary position in the seat. Some of the discomfort is due to being seated in an incorrect position. The present disclosure addresses these concerns by providing an occupant support system which represents benefits in terms of weight and easy integration into a vehicle eat when compared to conventional mechatronic or pneumatic massage and adjustment systems.

The invention claimed is:
1. An occupant support comprising
a vehicle seat comprising a seat bottom and a seat back coupled to the seat bottom and arranged to extend upwardly away from the seat bottom, the seat back including a seat frame, a cushion layer, and an outer occupant support surface configured to engage an occupant seated on the vehicle seat, and
a support mechanism coupled to the seat back between the seat frame and the cushion layer and configured to move relative to the seat frame between a first position and a different second position, wherein the support mechanism includes a suspension mat located between the seat frame and the cushion layer, a plurality of adjustable arms each having a fixed base portion coupled to the seat frame and a longitudinal projection portion coupled to the suspension mat to locate the plurality of arms between the seat frame and the suspension mat, the plurality of arms movable relative to the seat frame to cause the support mechanism to assume one of the first position and the second position, and a temperature controller coupled to the suspension mat and configured to provide means for controlling the temperature of a plurality of wires in the suspension mat to cause the wires to change the amount of tension applied to each of the arms as the temperature changes such that the support mechanism is in the first position when the wires are at a first temperature and the support mechanism is in the second position when the wires are at a second temperature greater than the first temperature.

2. The occupant support system of claim 1, wherein the plurality of wires are formed of smart shape memory alloy (S-SMA) material coupled to the adjustable arms and the temperature controller has a heater and a cooler to control the temperatures of the plurality wires.

3. The occupant support system of claim 2, wherein each adjustable arm is coupled to a different S-SMA wire so that each adjustable arm is individually adjusted.

4. The occupant support system of claim 2, wherein the plurality of adjustable arms further comprise pairs of adjustable arms, each pair coupled to the same S-SMA wire so that one S-SMA wire drives a pair of adjustable arms to a same second contour position.

5. The occupant support system of claim 1, wherein the plurality of arms comprises left arms coupled to the left side of the seat back and right arms coupled to the right side of the seat back, the left arms and the right arms are positioned symmetrically about a vertical axis of the seat back.

6. The occupant support system of claim 1, wherein the plurality of adjustable arms includes a left arm and a right arm and the left arm and the right arm coupled to one another to slide relative to one another.

7. The occupant support system of claim 6, wherein the left arm and the right arm are slidably coupled via a longitudinal slot at the end of one of the arms and a projection at the end at the other one of the arms.

8. The occupant support system of claim 1, wherein each adjustable arm is mounted vertically in the seat back so that each longitudinal projection portion extends vertically along the seat back and is configured to rotate about a pivot axis that extends horizontally relative to the seat back.

9. An occupant support device comprising
an arm having a fixed end adapted to couple to a seat back of a vehicle seat and a longitudinal projection configured to rotate about the fixed end, wherein the arm is mounted to the seat back for pivotable movement about a pivot axis that extends horizontally relative to the seat back between a first position in which the longitudinal projection is generally parallel with the seat back and a second position in which the longitudinal projection extends outwardly away from the seat back to change a contour of the seat back,
a wire made of a shape memory alloy and coupled to the arm in a predetermined configuration so that heating and cooling of the wire drives the rotation of the longitudinal projection of the arm,
wherein when the wire is above the austenitic temperature, the wire drives the arm from a relaxed to a supportive position.

10. The occupant support device of claim 9, wherein the arm comprises a plurality of arms, and each arm is configured to be securely mounted to a vehicle seat frame.

11. The occupant support device of claim 9, wherein the arm comprises a pair of arms, each arm in the pair is slidably coupled at an end of the longitudinal projection opposite the fixed end.

12. The occupant support device of claim 11, wherein the slidable coupling comprises a longitudinal slot mating with a projection so that the projection slides along the slot and the pair of arms remains coupled during rotation of the pair of arms.

13. The occupant support device of claim 9, wherein the arm is configured to be mounted so that the arm extends vertically along a vehicle seat back.

14. The occupant support of claim 9, wherein the seat back includes a seat frame, a cushion layer, a suspension mat located between the seat frame and the cushion layer, and an outer support surface configured to engage an occupant seated on the vehicle seat, and the arm is coupled to the seat frame and located between the seat frame and the suspension mat.

15. An occupant support system comprising
a vehicle seat comprising a seat bottom and a seat back coupled to the seat bottom and arranged to extend away from the seat bottom, the seat back including a seat frame, a cushion layer, a suspension mat located between the seat frame and the cushion layer, and an outer support surface configured to engage an occupant seated on the vehicle seat,
a plurality of adjustable arms coupled to and located in the seat back between the seat frame and the suspension mat, the adjustable arms each coupled to a shape memory alloy (SMA) wire to modify the support provided by the seat back, wherein each adjustable arm comprises a fixed end coupled to one of the SMA wires and a longitudinal projection configured to rotate toward and away from the seat back about a pivot axis that extends horizontally relative to the seat back to move the suspension mat of the vehicle seat toward the seat frame and away from the seat frame, and
a thermal activation controller having a heater and a cooler configured to regulate the temperature of the SMA wire to control the position of each adjustable arm.

* * * * *